(No Model.)
E. P. CLAY.
HARROW.
No. 312,254. Patented Feb. 17, 1885.
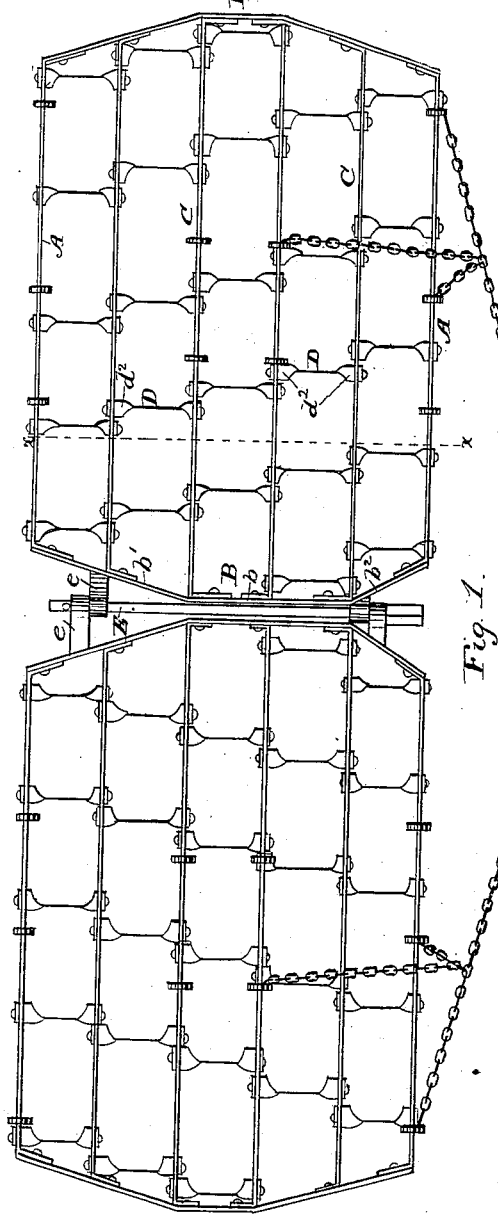
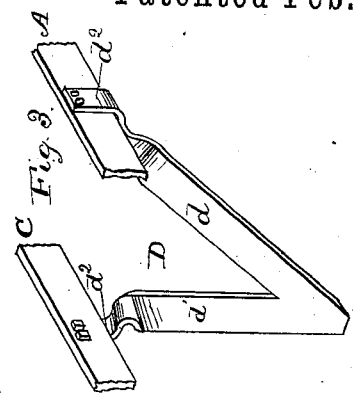
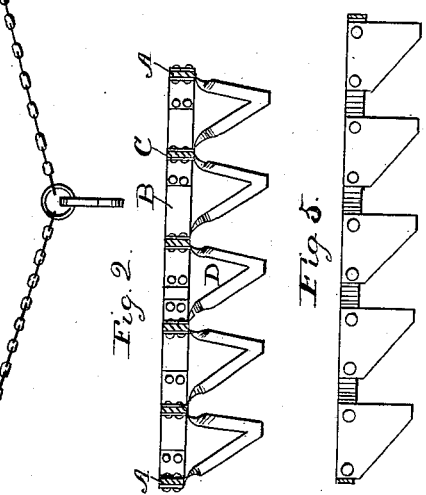
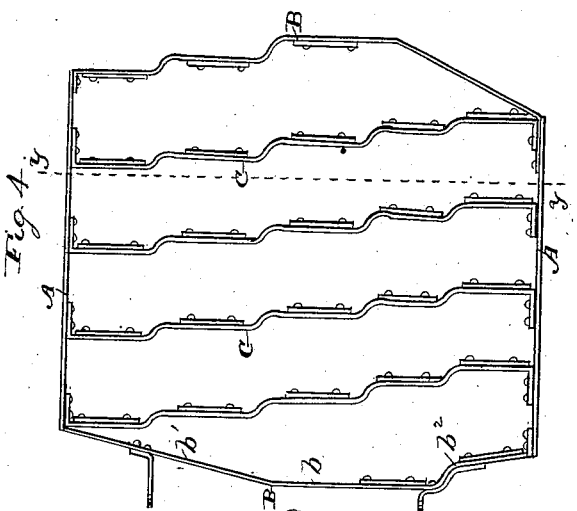
Witnesses:
H. E. Bliss
H. Burke
Inventor:
Edward P. Clay
by Doubleday & Bliss
attys.

UNITED STATES PATENT OFFICE.

EDWARD P. CLAY, OF MASSILLON, OHIO.

HARROW.

SPECIFICATION forming part of Letters Patent No. 312,254, dated February 17, 1885.

Application filed May 26, 1884. (No model.)

*To all whom it may concern:*

Be it known that I, EDWARD P. CLAY, a citizen of the United States, residing at Massillon, in the county of Stark and State of Ohio, have invented certain new and useful Improvements in Harrows, of which the following is a specification, reference being had therein to the accompanying drawings.

Figure 1 is a plan view of a harrow having my invention applied thereto. Fig. 2 is a section on the line $x\,x$, Fig. 1. Fig. 3 is a perspective view of one of the teeth detached. Fig. 4 is a top view of a harrow of a modified construction. Fig. 5 is a section on the line $y\,y$, Fig. 4.

The inventions which I desire to protect by this case relate to the peculiar frame-work of the harrow, the form of tooth shown in Figs. 1, 2, and 3, and their method of attachment.

The specific form of frame-work and tooth-supporting bars shown in Figs. 4 and 5 I have made the subject-matter of another application filed May 26, 1884, Serial No. 132,800, and hence do not claim herein.

Referring to the construction shown in Figs. 1 and 2, each frame consists of the front and rear cross-bars, A A, the side bars, B B, and the intermediate cross-bars, C C, extending from one side bar to the other.

For convenience of description I will call that part of the harrow to which the draft devices are shown attached the "front" part, though, as will be explained, either end may have the draft devices attached and be for that time the front end.

D D are the teeth, which are of substantial V shape, and are made from thin metal, preferably steel, the outer edges of the legs $d\,d'$ being sharpened to facilitate their cutting. The upper part of each leg of the tooth is given a quarter-turn, which forms a part, $d^2$, lying transverse to the body of the tooth. These portions $d^2$ lie against the faces of the cross-bars, to which they are secured by bolts, rivets, or otherwise. The teeth extend in diagonal lines across the frame, front to rear, and are so arranged that each tooth lies in a plane different from all the others relative to the line of draft—that is, so that no tooth lies directly in front of any other. The front tooth of each row is attached by means of the part $d^2$ upon the front leg, $d$, to the outer face of cross-bar A, and by means of the part $d^2$ of the rear leg, $d'$, to the rear face of the next cross-bar. The second tooth has its front leg attached to the first cross-bar C and its rear leg to the second cross-bar. The third tooth has its front leg attached to the second cross-bar and its rear leg to the next cross-bar in rear, and so on throughout the whole row or series of teeth, each tooth being attached to two of the cross-bars of the frame. By this arrangement I thoroughly and rigidly brace the frame, the teeth performing the double function of cutters or pulverizers and braces.

The above-described harrow is simple in construction, can be made by any blacksmith, is cheap and strong, and practically indestructible.

Any preferred style of draft devices may be employed, I having shown one composed of chains, which I have described in detail in the aforesaid application. It may be readily changed from one end of the harrow to the other, as the teeth may be made to cut deeper into the earth by dragging the harrow with the vertical legs $d'$ of teeth forward, than when the inclined legs $d$ act as the cutting portions.

In harrows as heretofore constructed having substantially rectangular frames which could be hinged together by a rigid connection, and carrying flat teeth or cutters, a considerable part of each frame has been practically useless for carrying teeth, as they would lie one in front of another; and it has also been necessary that the hinging parts should either lie above or project beyond the frame. Both of these difficulties I overcome by making my harrow-frame of the peculiar form shown—that is, the side bars, B, instead of being straight are bent to form three parts, $b^2\,b\,b'$. The front part, $b^2$, is arranged at an obtuse angle to the front bar A, and corresponding in length and direction to a short row of teeth lying close beside it. The next part, $b$, in rear of part $b^2$, is situated on a line parallel with the line of draft, and at right angles with the front and rear bars, A, while the third or rear part, $b'$, joins part $b$ with the rear cross-bar of the frame at an obtuse angle cutting off the inner rear corners of the frames, thus forming open spaces between the corners of the two frames. The outer side bars, B, are bowed or bent outward at the center in substantially the same manner. This form of outer or bounding frame necessitates that the central transverse bars C shall be longer than those at the ends, as will be readily seen. The frame which I thus construct is no larger than is actually necessary to inclose the cutting-teeth, and it can be closely hinged or joined to another similar frame by a bar or other non-flexible connection.

*e e* are hinge-plates projecting outwardly from the parts $b'$ $b^2$ of the side bar below the plane of the top of the frame, they being perforated to receive a long rod or connecting-bar, E, which lies directly between the two frames, and joins the two together.

To better illustrate this part of my invention, I have shown, in Figs. 4 and 5, a harrow of a somewhat different form, wherein A A represent the front and rear cross-bars; B B, the side bars, and C C the intermediate teeth-supporting bars. The bars C C, instead of crossing the frame parallel to bars A A, as in Fig. 1, extend diagonally across the frame between bars A A, and in order to properly arrange the teeth the bar is stepped or made zigzag, whereby the arrangement of the teeth is substantially as in construction in Fig. 1.

In both constructions of harrows shown it will be seen that there are short rows of teeth adjacent to each part $b^2$ of each side bar B B, those in Fig. 4 being mounted directly upon the side bars. To permit this, and yet cause the frame to occupy as little space as possible, I bend the side bars outwardly close to said short rows of teeth; but after passing said rows of teeth, instead of continuing upon the same line, I bend the side bars back and cause them to join the rear end bar close to the last tooth upon the adjacent row, thus avoiding the unavailable space which would be made otherwise, and also giving the harrow-frame a convenient form for hinging it to another section.

I am aware that it is not new to twist the shanks of the teeth used upon harrows and clod-crushers, and hence do not claim such as my invention; but my form of tooth and manner of attaching it to the cross-bars of the frame possess advantages not incident to any other form of which I have knowledge, in that the twisted portions of the tooth present broad, flat bearing faces, which may be firmly attached to the cross-bars, and when thus firmly secured to the harrow-frame the tooth cuts or pulverizes the soil in the most advantageous manner, as well as acts as a brace to strengthen the frame.

What I claim is—

1. The combination of the following elements: the front and rear bars, A, the intermediate tooth-supporting bars, C, the teeth arranged, substantially as described, to leave vacant spaces at the inner corners of each frame, the inner side bars, B, consisting of thin material formed to have the part $b$ and the parts $b'$ $b^2$ inclined to and integral with the part $b$, and arranged to leave open spaces between the inner corners of the frames, the plates $e$, projecting inwardly from the frame and below the top thereof, and the hinge-rod E, passing through said plates, substantially as set forth.

2. The combination, in a harrow, of two frames, each having a series of transverse tooth-supporting bars of thin flat material, the central bars of the series being longer than those in front and in rear thereof, the teeth arranged, substantially as set forth, to travel in different paths, the inner end bar B bent or curved outwardly at its ends, and the outer end bar B bent or curved at its ends inwardly, substantially as described, whereby the transverse bars are braced together.

3. In a harrow, the combination of two tooth-frames, each having a front bar A and a rear bar A, intermediate tooth-supporting bars, C C, and end bars, B B, the central portion of each of the inner end bars projecting toward the corresponding portion of the opposing inner end bar, and the hinge-rod E, lying by the sides of the oppositely-projecting parts of the inner end bars and connecting the two frames, substantially as set forth.

4. The combination, with the transverse supporting-bars A and C, of the teeth, each formed of a V-shaped flat metal bar having its upper ends turned at right angles to the operative portion, whereby one end can be secured to one bar with a wide, flat bearing, and the other to a bar in front thereof to brace the frame, substantially as described.

In testimony whereof I affix my signature in presence of two witnesses.

EDWARD P. CLAY.

Witnesses:
JACOB P. FAWCETT,
HENRY FISHER.